(12) United States Patent
Liaw et al.

(10) Patent No.: US 6,593,934 B1
(45) Date of Patent: Jul. 15, 2003

(54) AUTOMATIC GAMMA CORRECTION SYSTEM FOR DISPLAYS

(75) Inventors: Ming-Jiun Liaw, Hsinchu (TW); Ho-Hsin Yang, Tainan (TW); Yuh-Ren Shen, Tainan (TW)

(73) Assignee: Industrial Technology Research Institute (TW)

( * ) Notice: Subject to any disclaimer, the term of this patent is extended or adjusted under 35 U.S.C. 154(b) by 401 days.

(21) Appl. No.: 09/714,473

(22) Filed: Nov. 16, 2000

(51) Int. Cl.[7] .............................. G09G 5/02; H04N 5/14
(52) U.S. Cl. ........................ 345/590; 345/88; 345/89; 348/674
(58) Field of Search ................................. 345/589, 590, 345/88, 89, 100, 101; 348/674

(56) References Cited

U.S. PATENT DOCUMENTS

| | | | | |
|---|---|---|---|---|
| 5,959,650 A | * | 9/1999 | Fukui et al. ................. | 347/132 |
| 6,243,059 B1 | * | 6/2001 | Greene et al. ................ | 345/88 |
| 6,441,870 B1 | * | 8/2002 | Rapaich ....................... | 348/674 |

* cited by examiner

*Primary Examiner*—Matthew Luu

(57) ABSTRACT

This invention is related to an automatic Gamma correction system in which a novel display driving circuitry is designed with a digital/analog converter (DAC), wherein the Gamma reference voltages as well as the corresponding gray-scale values are adjustable. Therefore, the present invention provides a greater degree of freedom for the realization of the correction of Gamma parameters so as to fit the curve representing the transfer function of the destination gray-scale values and the voltages required by the display driving circuitry.

25 Claims, 12 Drawing Sheets

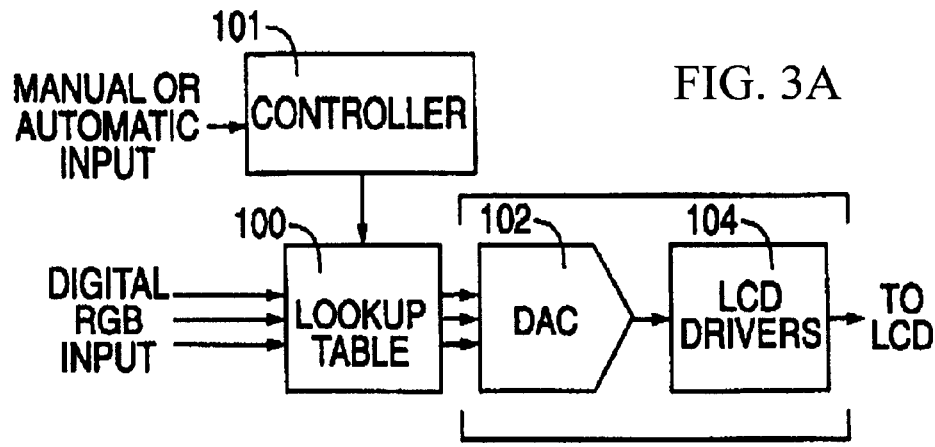
FIG. 3A
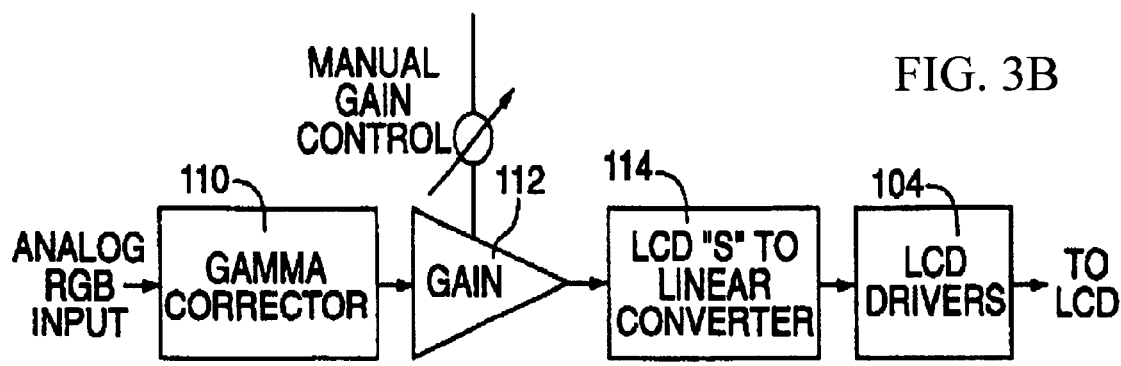
FIG. 3B
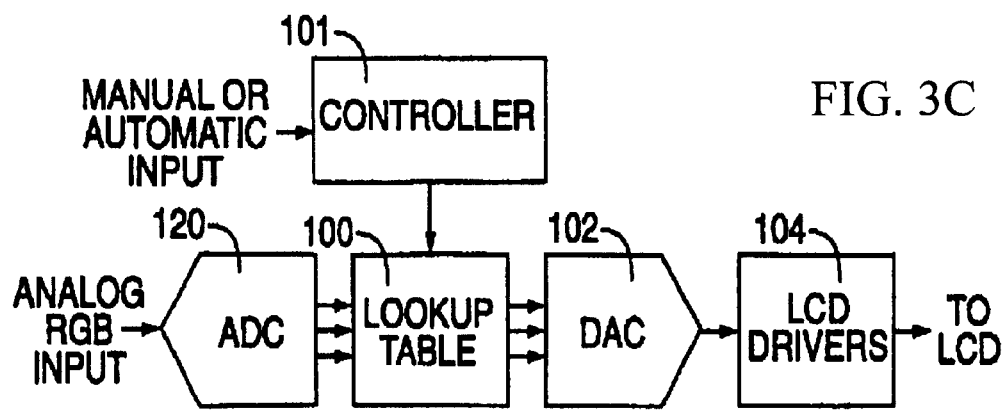
FIG. 3C
FIG. 3 (PRIOR ART)

AUTOMATIC GAMMA CORRECTION SYSTEM FOR DISPLAYS

BACKGROUND OF THE INVENTION

1. Field of the Invention

The present invention generally relates to an automatic Gamma correction system for displays, and more particularly, to an automatic Gamma correction system in which a novel display driving circuitry designed with a digital/analog converter (DAC) and associated circuitry is used to provide a greater degree of freedom for the realization of the correction of Gamma parameters.

2. Description of the Prior Art

Recently, the technique in the field of displays has grown rapidly with the fast development in opto-electronics. However, for a display (a television having a conventional picture tube or a state-of-the-art thin film transistor-liquid crystal display), the realization of the correction of Gamma parameters has become a key technique. It is mainly due to the fact that the relation between the gray-scale value and the signal voltage as well as the relation between the gray-scale value and the luminance of a display is non-linear, and such non-linearity must be corrected by using Gamma parameters so that the signal voltage and the gray-scale value or the luminance can meet the requirement of linearity and thus high image quality can be obtained. Accordingly, the correction of Gamma parameters is one of the major considerations in the development of display industry. However, due to the inevitable process unreliability, the characteristics of each display are somewhat different, therefore, the individual correction of Gamma parameters of each display is required. It suffers from waste of time and high manufacturing cost.

In the prior arts, in order to achieve automatic correction of Gamma parameters, it has been provided a feedback system with a sensor disposed inside the display, as shown in FIG. 1. Such knowledge is disclosed, for example, in the U.S. Pat. No. 6,046,719 as entitled "Column Driver With Switched-Capacitor D/A Converter" filed on Jul. 7, 1997. As shown in the drawing, a temperature sensor (1014) is disposed in the liquid-crystal display (1012). The lifetime of the display is taken into consideration so as to calculate the Gamma parameters and perform Gamma correction (1010). Later, the result is further input into the column driver (i.e., the data driver) (1018) display. Therefore, the signal voltage is fixed.

However, such a conventional technique, as shown in FIG. 1, has two major setbacks: (1) lack of flexibility in practical use due to the influence of the change in individual display setting upon the correction of Gamma parameters; and (2) incompatibility to different displays when the built-in voltage dividing function of any two Gamma reference voltages is fixed.

Another conventional circuit configuration, as shown in FIG. 2, is provided to improve the control system for the uniformity in luminance and/or color of the display. Such knowledge is disclosed, for example, in the U.S. Pat. No. 6,043,797 as entitled "Color and Luminance Control System for Liquid Crystal Projection Display" filed on Nov. 5, 1996. As shown in the drawing, the display is divided into nine sections (12A~12N) and their corresponding control units perform the correction of Gamma parameters respectively. The detailed circuits of the embodiments of such a disclosure are shown in FIGS. 3A, 3B and 3C, illustrating the input analog and/or digital RGB signals and the controlling approaches of display driving.

However, such a conventional technique, as shown in FIGS. 2 and 3, has two major setbacks: (1) lack of flexibility in practical use due to the large amount of data storage and complicated Gamma curve calculation for all the possible Gamma correction curves necessary for each display to be stored in the look-up table 100; and (2) sacrificed gray-scale quality due to the changing approach of the gray-scale of image for Garmna correction in digital systems.

Furthermore, the gray-scale values with respect to the external Gamma reference voltages of the data driver used in the mentioned conventional techniques are fixed. Please refer to FIGS. 4A and 4B, wherein FIG. 4A shows the relation curve of the gray-scale values and the voltages and FIG. 4B shows the adjustable voltage range with respect to different gray-scale values. To be more specific, as shown in FIG. 4B, the Gamma reference voltages ($V_1$~$V_5$) are adjustable with the corresponding gray-scale values (0, 32, 192, 230, and 255) fixed. This reduces the degree of freedom for the realization of the correction of Gamma parameters and leads to greater difference of the transfer curve and the destination function. As a result, the image quality of the display is adversely affected. In other words, sacrificed gray-scale quality is bound to occur when the gray-scale value is changed for Gamma parameter correction.

SUMMARY OF THE INVENTION

It is thus the primary object of the present invention to provide an automatic Gamma parameter correction system in which a novel data driver is designed with a digital/analog converter (DAC), wherein the Gamma reference voltage as well as the corresponding gray-scale value is adjustable.

In order to achieve the foregoing object, the present invention provides two methods for gray-scale-to-voltage transfer. For an N-bit system, the first gray-scale-to-voltage transfer method results in $2^N$ divided voltages output into a working display, and the second gray-scale-to-voltage transfer method results in at least $2^N$ divided voltages, among which only $2^N$ divided voltages are corresponded to be output into a series of output buffers. Therefore, according to the present invention, a greater degree of freedom for the realization of the correction of Gamma parameters is obtained, so as to fit the curve representing the transfer function of the destination gray-scale values and the voltages required to drive the working displays properly.

In one embodiment according to the present invention, an automatic Gamma parameter correction system for displays comprises: a plurality of sensors, disposed inside the display or outside the display for obtaining the voltage-to-luminance curve so as to evaluate a set of Gamma reference voltages; a main controller, connected to the sensors to serve as a main control circuit for the system, and further including a central process unit (CPU) and a memory for parameter calculation and data storage. The sensors can be light sensors, temperature sensors, pixel voltage sensors, or a pixel charging/discharging current sensors used for measuring at least one parameter so as to evaluate the voltage-to-luminance curve or the Gamma voltages as well as the corresponding digital gray-scale values required to establish a gray-scale-to-voltage destination curve for driving displays.

The main controller is connected to a programmable Gamma voltage generating means that generates a set of Gamma reference voltages output into the input terminals of a set of programmable switches according to the Gamma reference voltages evaluated by the central process unit in the main controller. The programmable switches are connected to the programmable Gamma voltage generating means so as to receive the output voltages and also connected to a switch control unit. The switch control unit is to interconnect the programmable switches and the voltage dividing circuit with a set of corresponding gray-scale values according to the gray-scale signals with respect to the switch control unit. Furthermore, such a system can be used together with adjusting means for luminance, contrast, and color temperature and a back-lighting control unit.

The input terminal of the switch control unit is connected to the main controller and the output terminals of the switch control unit are connected to the programmable switches, so that the switch control unit interconnects the output terminals of the programmable switches and the voltage dividing circuit having a series divided voltage points and then applies the Gamma reference voltages to the corresponding divided voltage points according to the corresponding gray-scale signals delivered from the central process unit. The output terminals of the programmable switches are connected to the voltage dividing circuit implemented by using a digital-to-analog converter (DAC). For an N-gray-scale system, a voltage dividing circuit can output at least $2^N$ divided voltages, and then the voltages are further connected to a series of output buffers.

When the Gamma parameter correction is performed, the parameters related to the system are determined. The voltage-to-luminance curve of the display is then evaluated by using the sensors according to the driving voltage range determined by the parameters. Later, the main controller determines the destination function of the gray-scale-to-voltage transfer curve, and the voltage dividing circuit further implements the transfer curve. Then, the Gamma reference voltages required by the voltage dividing circuit as well as the corresponding gray-scale values are evaluated. The Gamma reference voltages and the corresponding gray-scale values are interconnected by the programmable switches and the switch control unit, so as to build up a gray-scale-to-voltage curve under the state that the Gamma reference voltages and the corresponding gray-scale values are adjustable. The voltage dividing circuit outputs corresponding voltages to the output buffers according to the input gray-scale values of the image.

From the above description, the present invention provides an automatic Gamma parameter correction method for displays, comprising the steps of: (a) determining related parameters for the displays; (b) determining a driving voltage range according to the parameters; (c) repeating (a) if the determined parameters exceed the driving voltage range for the displays; (d) measuring a voltage-to-luminance curve of the displays; (e) determining a destination function of gray-scale-to-voltage transfer curve; (f) evaluating a set of Gamma reference voltages required by the voltage dividing circuit as well as corresponding gray-scale values; (g) interconnecting the Gamma reference voltages and the corresponding gray-scale values by using the programmable switches and the switch control unit, so as to build up a gray-scale-to-voltage curve; and (h) outputting corresponding voltages to a series of output buffers by using the voltage dividing circuit according to the input gray-scale values of the image.

On the other hand, the present invention provides an automatic Gamma parameter correction method for displays, so as to cooperate with conventional data drivers. The system comprises: a plurality of sensors, disposed inside the display for sensing the relative luminance of a series of voltage signals so as to obtain the voltage-to-luminance curve; a main controller, connected to the sensors to serve as a main control circuit for the system, and further including a central process unit and a memory for parameter calculation and data storage; a programmable Gamma voltage generating means, connected to the main controller and generating a set of Gamma reference voltages output into the input terminal of the data driver according to the reference voltage evaluated by the central process unit in the main controller; and at least a data driver, directly connected to the programmable Gamma voltage generating means and generating a image driving signal delivered into the display according to the Gamma reference voltage outputs by the programmable Gamma voltage generating means. Furthermore, such a system can be used together with adjusting means for luminance, contrast, and color temperature and a back-lighting control unit.

It is preferable that the voltage-to-luminance curve, according to the present invention, can be obtained by evaluating, measuring or table-checking.

BRIEF DESCRIPTION OF THE DRAWINGS

The objects, spirits and advantages of the preferred embodiment of the present invention will be readily understood by the accompanying drawings and detailed descriptions, wherein:

FIGS. 3A–3C show different circuits from the circuit as shown in FIG. 2 in the U.S. Pat. No. 6,043,797;

FIGS. 6A–6B show two graphs illustrating the gray-scale-to-voltage transfer curves of the data driver of a conventional display, wherein the voltage value is adjustable but the corresponding gray-scale value is not adjustable;

DETAILED DESCRIPTION OF THE INVENTION

The present invention provides an automatic Gamma parameter correction system in which a novel data driver is designed with a digital/analog converter (DAC), wherein the Gamma reference voltage as well as the corresponding gray-scale value is adjustable. Therefore, the present invention provides a greater degree of freedom for the realization of the correction of Gamma parameters so as to fit the curve representing the transfer function of the destination gray-scale value and the voltage required to drive the working displays properly.

Figure 1:
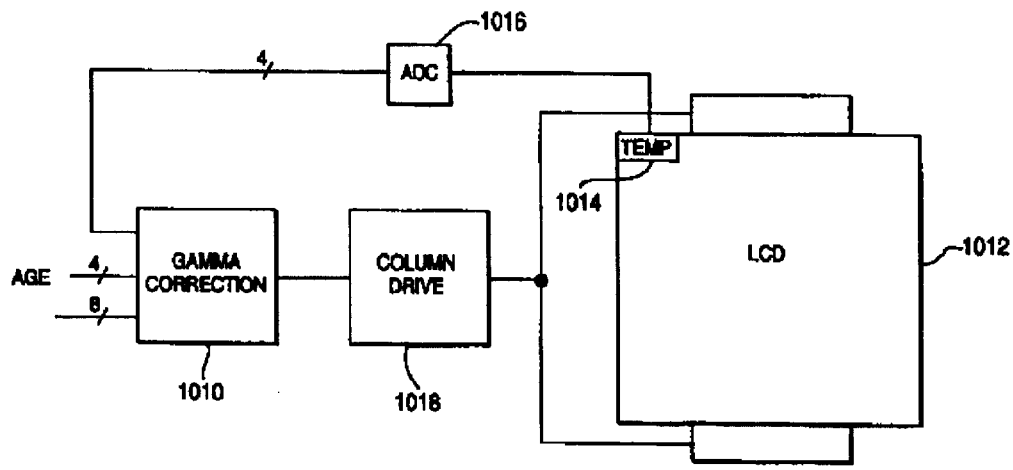
FIG. 1 is a schematic circuit diagram of one embodiment in the U.S. Pat. No. 6,046,719.
Figure 4A:
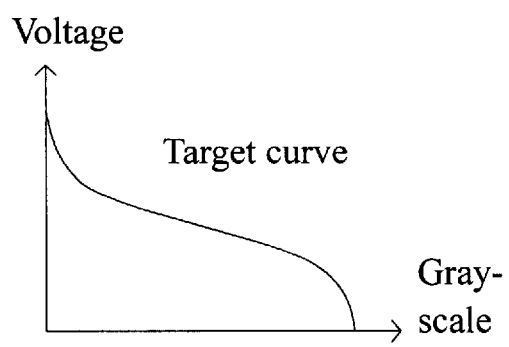
Figure 4B:
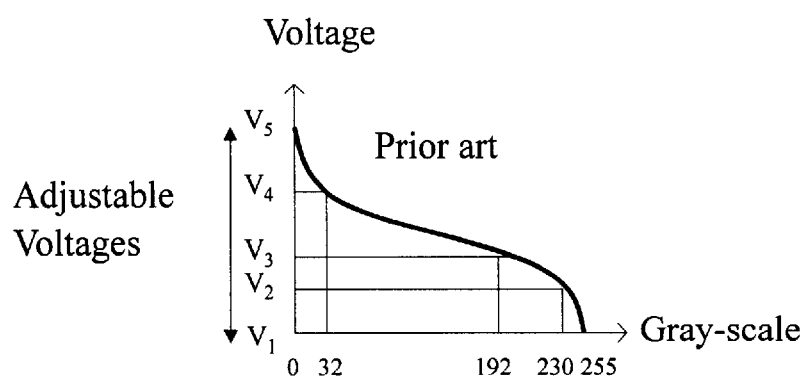
Figure 2:
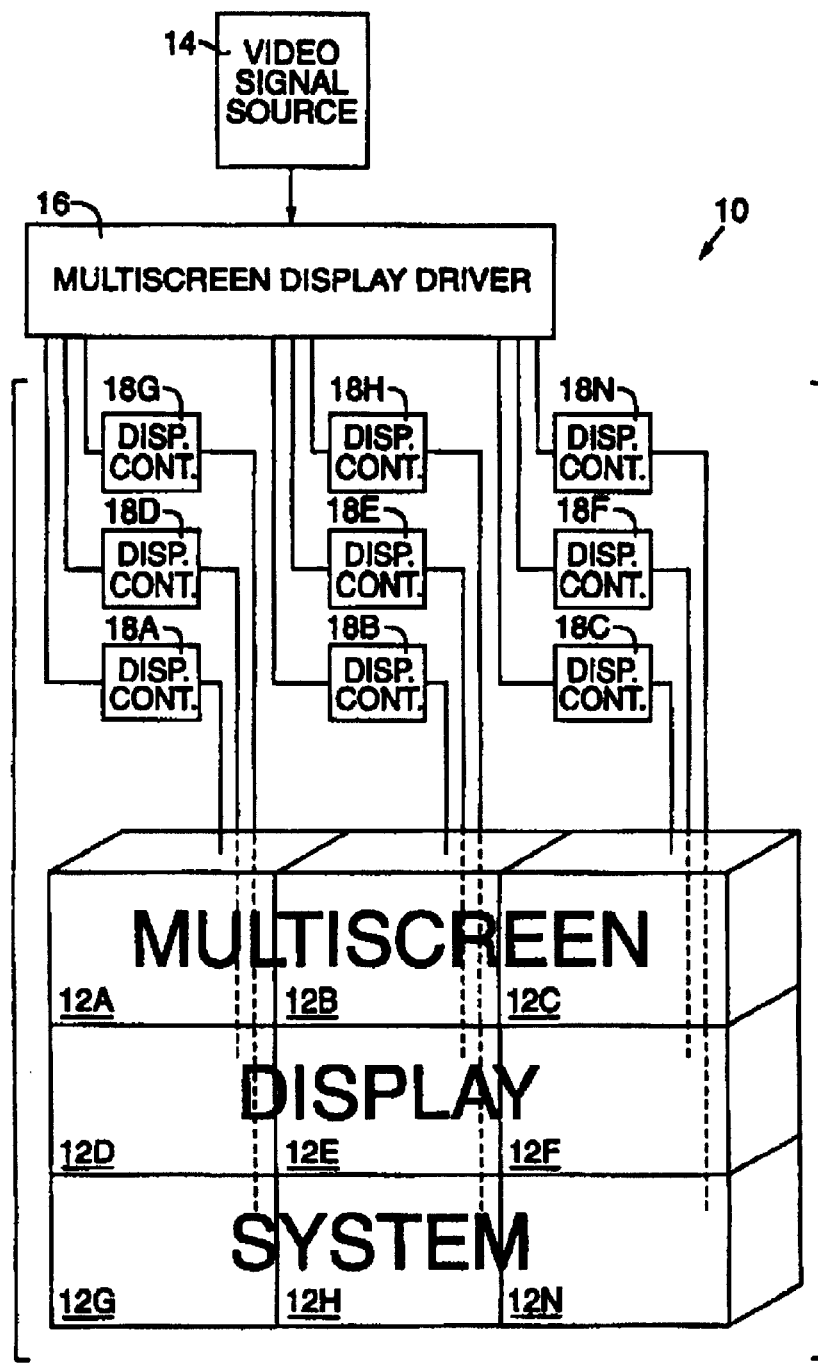
FIG. 2 is a schematic circuit diagram of one embodiment in the U.S. Pat. No. 6,043,797.
Figure 5:
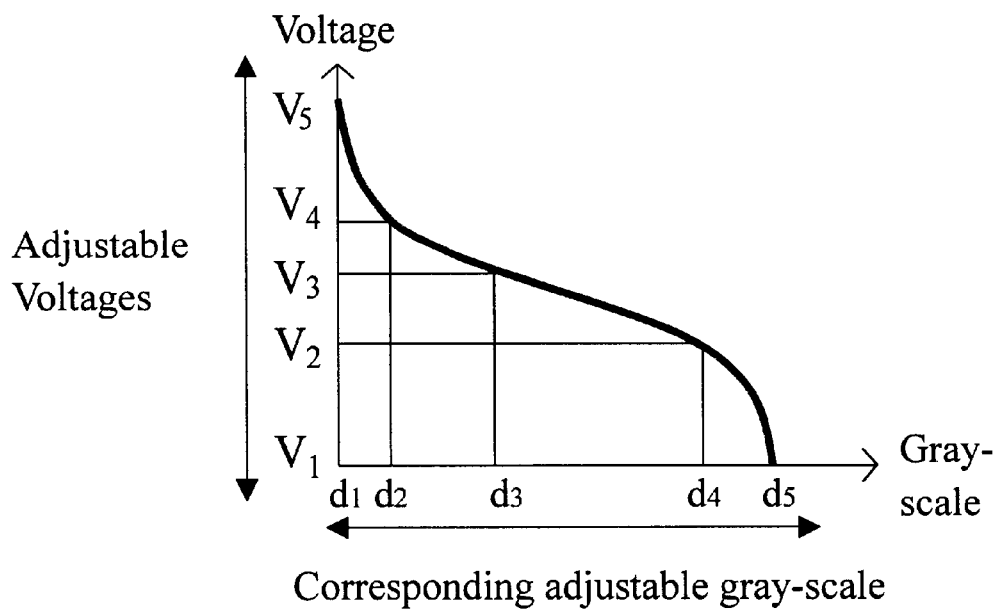
FIG. 5 is a graph illustrating a gray-scale-to-voltage transfer curve in accordance with one embodiment of the present invention.
Figure 6:
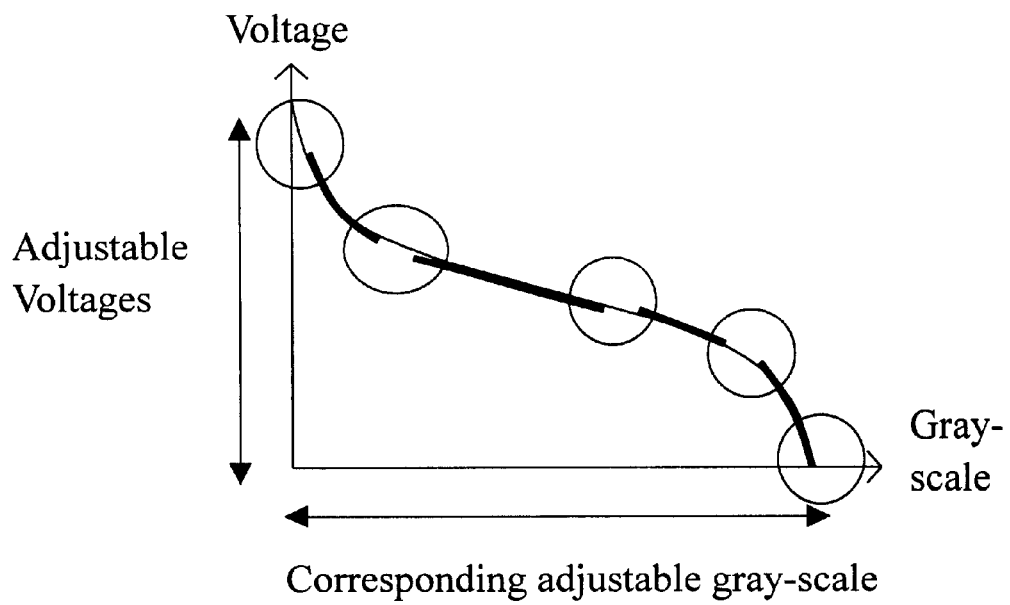
FIG. 6 is a graph illustrating another gray-scale-to-voltage transfer curve in accordance with another embodiment of the present invention.

Please refer to FIG. 5, which is a graph illustrating a gray-scale-to voltage transfer curve in accordance with one embodiment of the present invention. As shown in FIG. 5, there are five adjustable reference voltages $V_1$, $V_2$, $V_3$, $V_4$, $V_5$ and five corresponding adjustable gray-scales $d_1$, $d_2$, $d_3$, $d_4$, $d_5$. Moreover, FIG. 6 is another graph illustrating a gray-scale-to-voltage transfer curve in accordance with one embodiment of the present invention. As shown in FIG. 6, there are four pieces of bold lines with five turning points (as circled). The major difference of these two cases is the number of divided voltages. For an N-bit system, the first gray-scale-to-voltage transfer method (as shown in FIG. 5) results in $2^N$ divided voltages output into a working display, and the second gray-scale-to-voltage transfer method (as shown in FIG. 6) results in at least $2^N$ divided voltages, among which only $2^N$ divided voltages (shown as the bold lines) are corresponded to be output into a series of output buffers. Therefore, according to the present invention, a greater degree of freedom for the realization of the correction of Gamma parameters is obtained, so as to fit the curve representing the transfer function of the destination gray-scale values and the voltage required to drive the working displays properly.

Figure 7A:
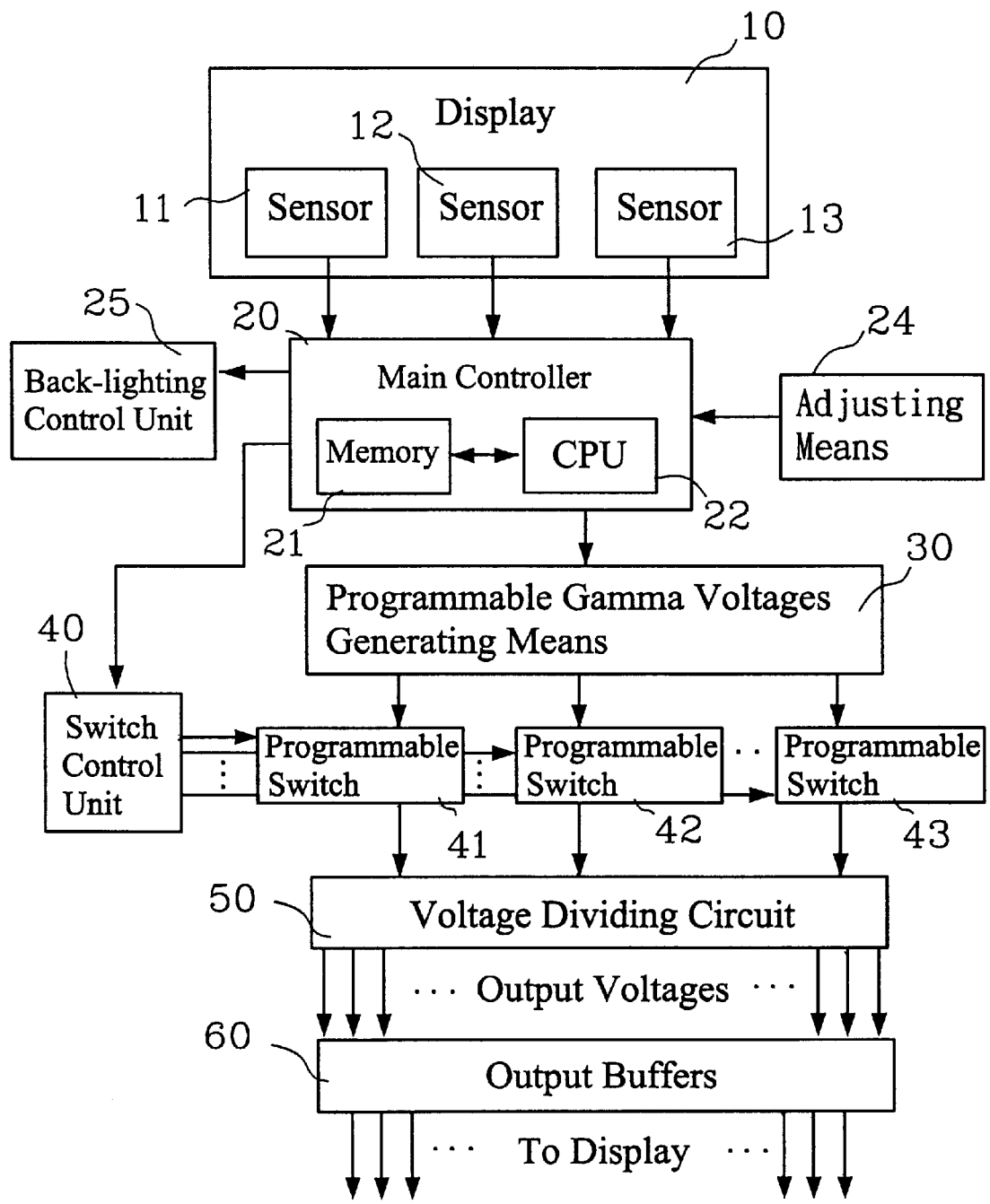
FIG. 7A is a schematic circuit diagram accompanied with a novel data driver in accordance with one embodiment of the present invention.
Figure 7B:
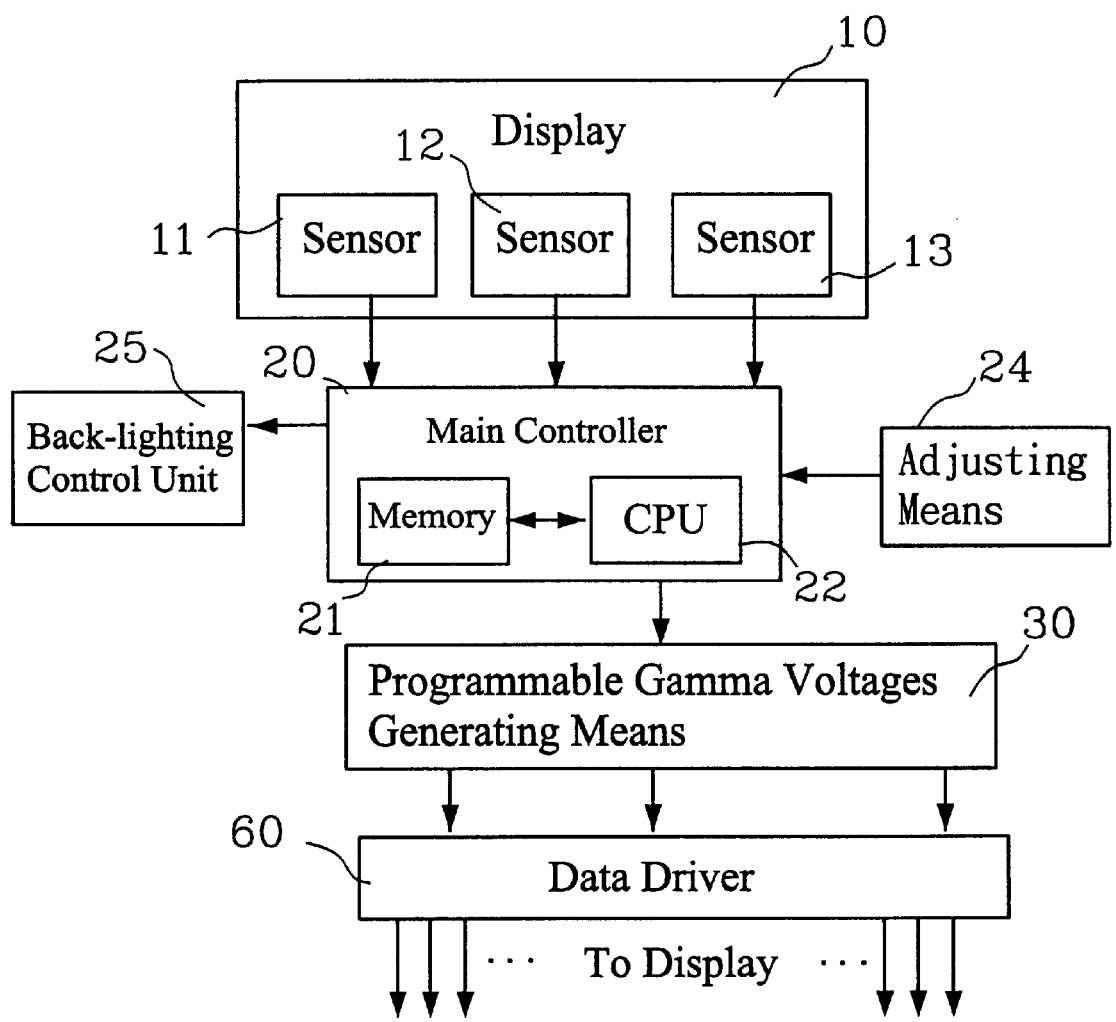
FIG. 7B is a schematic circuit diagram accompanied with a conventional data driver in accordance with another embodiment of the present invention.
Figure 8:
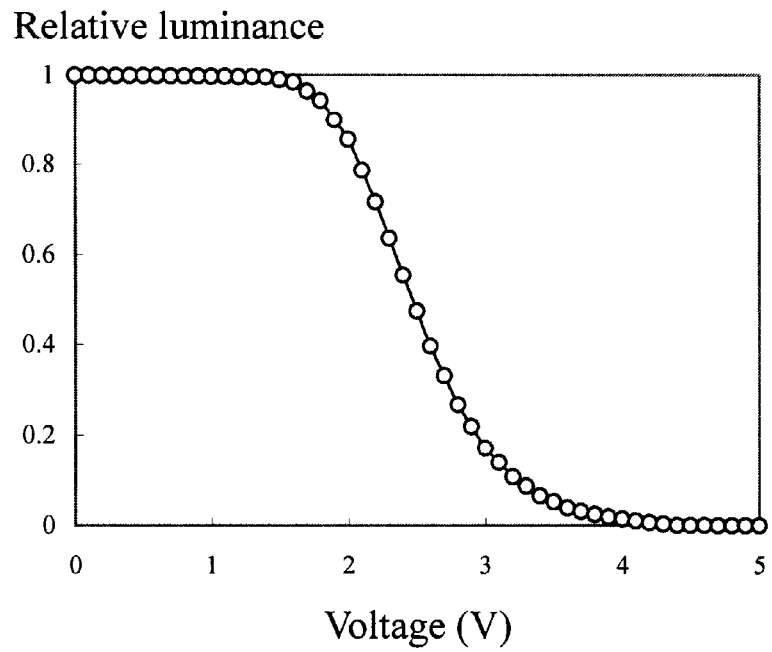
FIG. 8 is a graph illustrating a voltage-to-luminance curve built up by the sensors in accordance with one embodiment of the present invention.

For the main structure of the automatic Gamma parameter correction system according to the present invention, please refer to FIGS. 7A and 7B, among which FIG. 7A is a schematic circuit diagram accompanied with a novel data driver in accordance with one embodiment of the present invention and FIG. 7B is a schematic circuit diagram accompanied with a conventional data driver in accordance with another embodiment of the present invention. First, as shown in FIG. 7A, the provided system comprises a plurality of sensors 11, 12 and 13, disposed inside the display 10 or outside the display 10 for obtaining the voltage-to-luminance curve so as to evaluate the Gamma reference voltages. In the beginning of the correction operation, a series of voltage signals are delivered into the sensors 11, 12, and 13 to sense the relative luminance so as to obtain the voltage-to-luminance curve. The voltage-to-luminance curve is shown in FIG. 8, wherein the luminance is relative luminance.

The sensors 11, 12 and 13 can be light sensors, temperature sensors, pixel voltage sensors, or pixel charging/discharging current sensors used for measuring at least one parameter. So as to evaluate the voltage-to-luminance curve or the Gamma voltages as well as the corresponding digital gray-scale values required to establish a gray-scale-to-voltage destination curve for driving displays during said operation of said systems.

Figure 9:
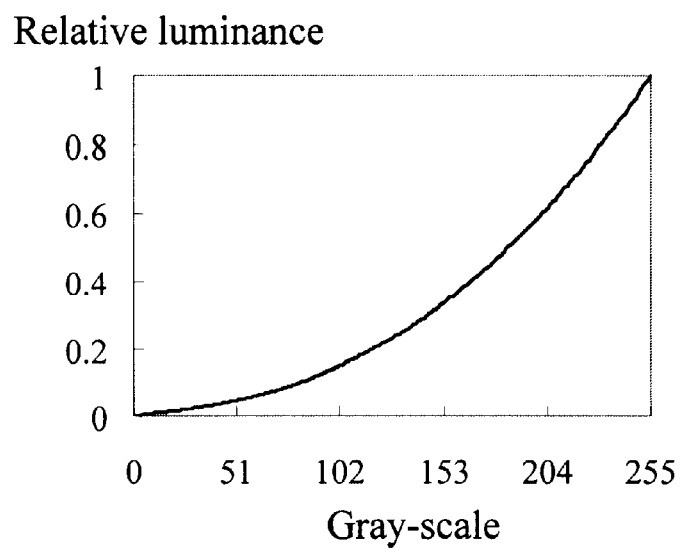
FIG. 9 is a graph illustrating a gray-scale-to-luminance destination curve that can be stored by the memory in accordance with one embodiment of the present invention.

The provided system, as shown in FIG. 7A, further comprises a main controller 20, connected to the sensors 11, 12 and 13 to serve as a main control circuit for the system, and further including a central process unit (CPU) 22 and a memory 21 for parameter calculation and data storage. Moreover, the memory 21 can store at least one gray-scale-to-luminance destination curve, as shown in FIG. 9, which is a graph illustrating a gray-scale-to-luminance destination curve that can be stored by the memory in accordance with one embodiment of the present invention, wherein the luminance is relative luminance. Furthermore, the memory 21 can store the Gamma reference voltage evaluated by the central process unit as well as the corresponding gray-scale value. Furthermore, such a system can be used together with adjusting means 24 for luminance, contrast, and color temperature and a back-lighting control unit 25.

Figure 10:
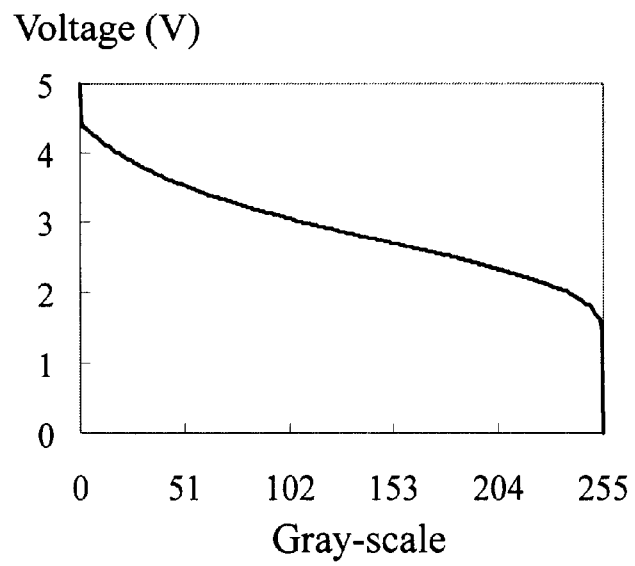
FIG. 10 is a graph illustrating a gray-scale-to-voltage transfer curve in accordance with one embodiment of the present invention.

On the other hand, the operation of the central process unit (CPU) 22 can be divided into two parts:

1. Loading the voltage-to-luminance curve and the gray-scale-to-luminance destination curve and determining the Gamma reference voltage range according to luminance, contrast and color temperature. So as to fit the curve representing the transfer function of the destination gray-scale values and the voltages required to drive the working display properly, as shown in FIG. 10; and 2. Optimizing (by using programs) or cooperating with circuits for the display to evaluate the Gamma reference voltages and the corresponding gray-scale values of the desired gray-scale-to-luminance destination curve. And then delivering signals which present the Gamma reference voltages into the programmable Gamma voltage generating means 30 and delivering the corresponding gray-scale values to the switch control unit 40.

The main controller 20 is connected to a programmable Gammna voltage generating means 30 that generates a set of Gamma reference voltages output into the input terminals of a set of programmable switches 41, 42 and 43 according to the Gamma reference voltages evaluated by the central process unit 22 in the main controller 20. For more detailed description about the programmable Gamma voltage generating means 30, please refer to FIG. 11, which is a schematic circuit diagram of a programmable Gamma voltage generating means 30 in accordance with one embodiment of the present invention. The programmable Gamma voltage generating means is composed of a digital-to-analog converter (DAC) connected to a plurality of buffers, so as to output the Gamma reference voltages by adjusting the received destination function of the Gamma voltage output by the main controller 20.

Figure 12:
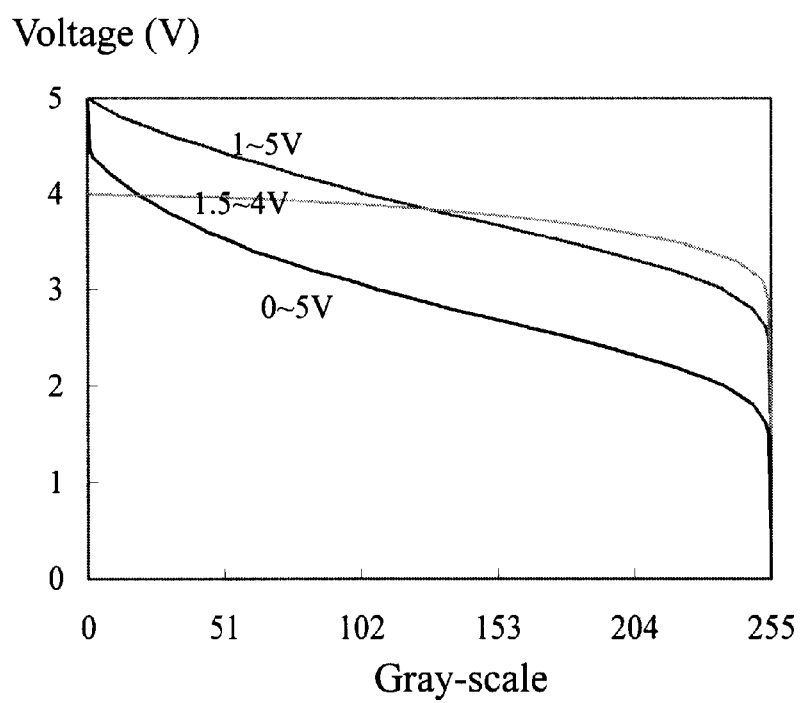
FIG. 12 is a graph illustrating a gray-scale-to-voltage curve, in which the gray-scale-to-voltage curve moves with respect to the adjustable Gamma reference voltage of the display.

The programmable switches 41, 42 and 43 are connected to the programmable Gamma voltage generating means 30 so as to receive the output voltage and also connected to a switch control unit 40, so as to interconnect the output terminals of the programmable switches 41, 42 and 43 and the voltage dividing circuit 50 with a set of corresponding gray-scale values according to the gray-scale signals with respect to the switch control unit 40. The input terminal of the switch control unit 40 is connected to the main controller 20. The output terminals of the switch control unit 40 are connected to the programmable switches 41, 42 and 43, so that the switch control unit 40 interconnects the output terminals of the programmable switches 41, 42 and 43. The voltage dividing circuit 50 having a series divided voltage points applies the Gamma reference voltages to the corresponding divided voltage points according to the corresponding gray-scale signals delivered from the central process unit (CPU) 22. That is both the Gamma reference voltages and the corresponding gray-scale signals are adjustable under the CPU 22 evaluating. The output terminals of the programmable switches 41, 42 and 43 are connected to the voltage dividing circuit 50 implemented by using a digital-to-analog converter (DAC). For an N-gray-scale system with M Gamma reference voltages, the number of required programmable switches is larger than but smaller than N. The reason is explained as below:

For a voltage-to-luminance (V-L) curve, the voltage range (as adjusted according to the display) determines the gray-scale-to-voltage transfer curve, as shown in FIG. 12, which illustrates a gray-scale-to-voltage curve moving with respect to the adjustable Gamma reference voltages of the display. However, according to the experimental result, the corresponding gray-scale values at the turning points of the curves locate very close to one another. Therefore, it is necessary only to install a switch adjacent to a certain gray-scale value so that the present invention only needs a limited number of programmable switches. Of course, the programmable switches 41, 42 and 43 can also be continuously disposed if needed.

Figure 13:
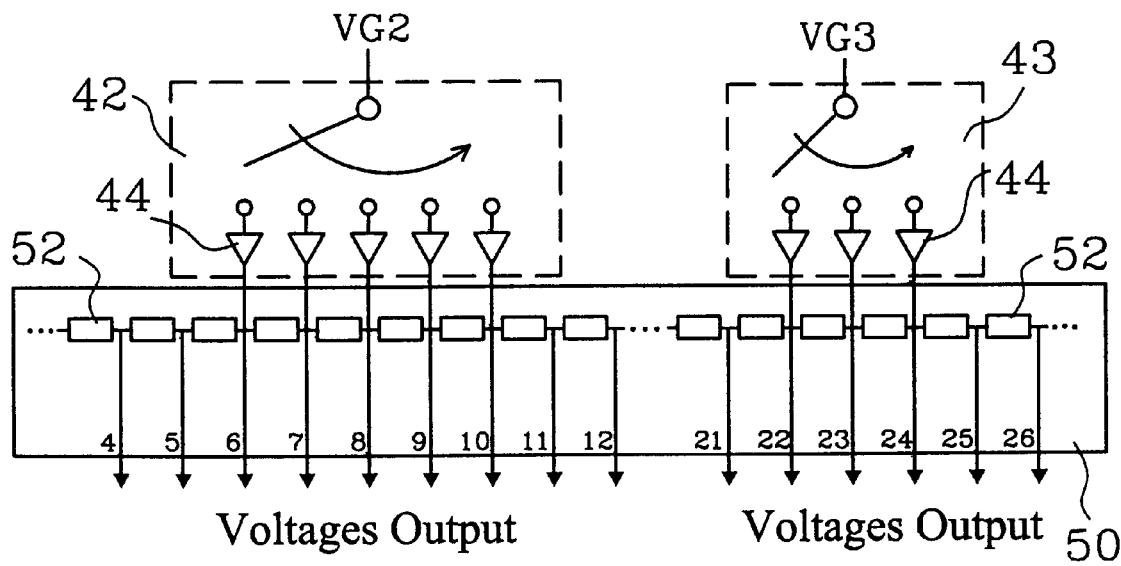
FIG. 13 is a circuit configuration illustrating the interconnection of the programmable switches and the voltage dividing circuit in accordance with one embodiment of the present invention.

Please refer to FIG. 13, which is a circuit configuration illustrating the interconnection of the programmable switches 42 and 43 and the voltage dividing circuit 50 in accordance with one embodiment of the present invention. Taking the second Gamma reference voltage $VG_2$ for example, the number of required programmable switches is five if the corresponding gray-scale varies from 6 to 10. The output of each switch is connected to a buffer 44. If the third Gamma reference voltage $VG_3$ is determined to switch among the gray-scale values 22~24 (or the third Gamma reference voltage $VG_3$ can also be determined to switch among the gray-scale values 11~13, then the second Gamma reference voltage $VG_2$ and the third Gamma reference voltage $VG_3$ can cooperate to be determined to switch among the gray-scale values from 6 to 12 or from 7 to 13), only three programmable switches are required and the number of the programmable switches is smaller than the number of output voltages. Taking a 9 Gamma reference voltage system for example, if the maximum and the minimum Gamma reference voltages (corresponding to the 0th and the (N−1)th gray-scale, respectively ) are omitted, only 7 Gamma reference voltages need to be processed by the programmable switches. In other words, if each of the Gamma reference voltages needs 5 programmable switches, only 35 programmable switches are required for implementation.

Moreover, the voltage dividing circuit 50 connected to the output terminals of the programmable switches 41, 42 and 43 can output at least $2^N$ voltages for an N-bit system. Then the voltages are input into a series of output buffers 60 (shown in FIG. 7A). In general, the voltage dividing circuit 50 is typically implemented by using resistors 52 or a circuit composed of resistors, as shown in FIG. 13. In the drawing, the block represents the resistors, capacitors or a circuit composed of resistors and capacitors. It is preferable that the output of the voltage dividing circuit 50 is further connected to a plurality of buffers so as to improve the drivability for a next stage.

For an N-bit gray-scale system, the resistors can output at least $2^N$ voltages, and the input terminals—are connected to the output terminals of the programmable switches, as shown in FIG. 13, so as to build up the gray-scale-to-voltage curve for a data driver circuitry. Such a voltage dividing circuit 50 is characterized in that: (1) any two of the Gamma reference voltages can be linear or non-linear; (2) the transfer functions of different reference voltages can be different; and (3) the voltage dividing circuit at the boundary can be alternatively designed so that the divided voltages can meet the requirement of the different transfer functions on the both sides of the boundary.

According to the above description, an automatic Gamma parameter correction system can thus be built up for the present invention. Concerning the applications of the present invention, it can be used in a single-screen display or a multi-screen display and can also divide the screen into several regions that are controlled independently.

Next, an automatic Gamma parameter correction system accompanied with at least a conventional data driver for displays will be described hereinafter. Please refer to FIG. 7B, which is a schematic circuit diagram accompanied with at least a conventional data driver in accordance with another embodiment of the present invention. The system shown in FIG. 7B is almost the same with the system shown in FIG. 7A except that the former does not comprises a set of programmable switches and a voltage dividing circuit, so as to cooperate with a conventional data driver. The system, as shown in FIG. 7B, comprises a plurality of sensors 11~13 disposed inside the display 10 for sensing the relative luminance of a series of voltage signals so as to obtain the voltage-to-luminance curve;

The sensors 11, 12 and 13 can be light sensors, temperature sensors, pixel voltage sensors, or a pixel charging/discharging current sensors used for measuring at least one parameter, so as to evaluate the voltage-to-luminance curve or the Gamma voltages as well as the corresponding digital gray-scale values required to establish a gray-scale-to-voltage destination curve for driving displays during said operation of said systems.

The provided system, as shown in FIG. 7B, further comprises a main controller 20, connected to the sensors 11, 12 and 13 to serve as a main control circuit for the system, and further including a central process unit 22 and a memory 21 for parameter calculation and data storage. Moreover, the memory 21 can store at least one gray-scale-to-luminance destination curve, as shown in FIG. 9, which is a graph illustrating a gray-scale-to-luminance destination curve that can be stored by the memory in accordance with one embodiment of the present invention, wherein the luminance is relative luminance. Furthermore, the memory 21 can store the Gamma reference voltages evaluated by the central process unit as well as the corresponding gray-scale values. Furthermore, such a system can be used together with adjusting means 24 for luminance, contrast, and color temperature and a back-lighting control unit 25.

Figure 14:
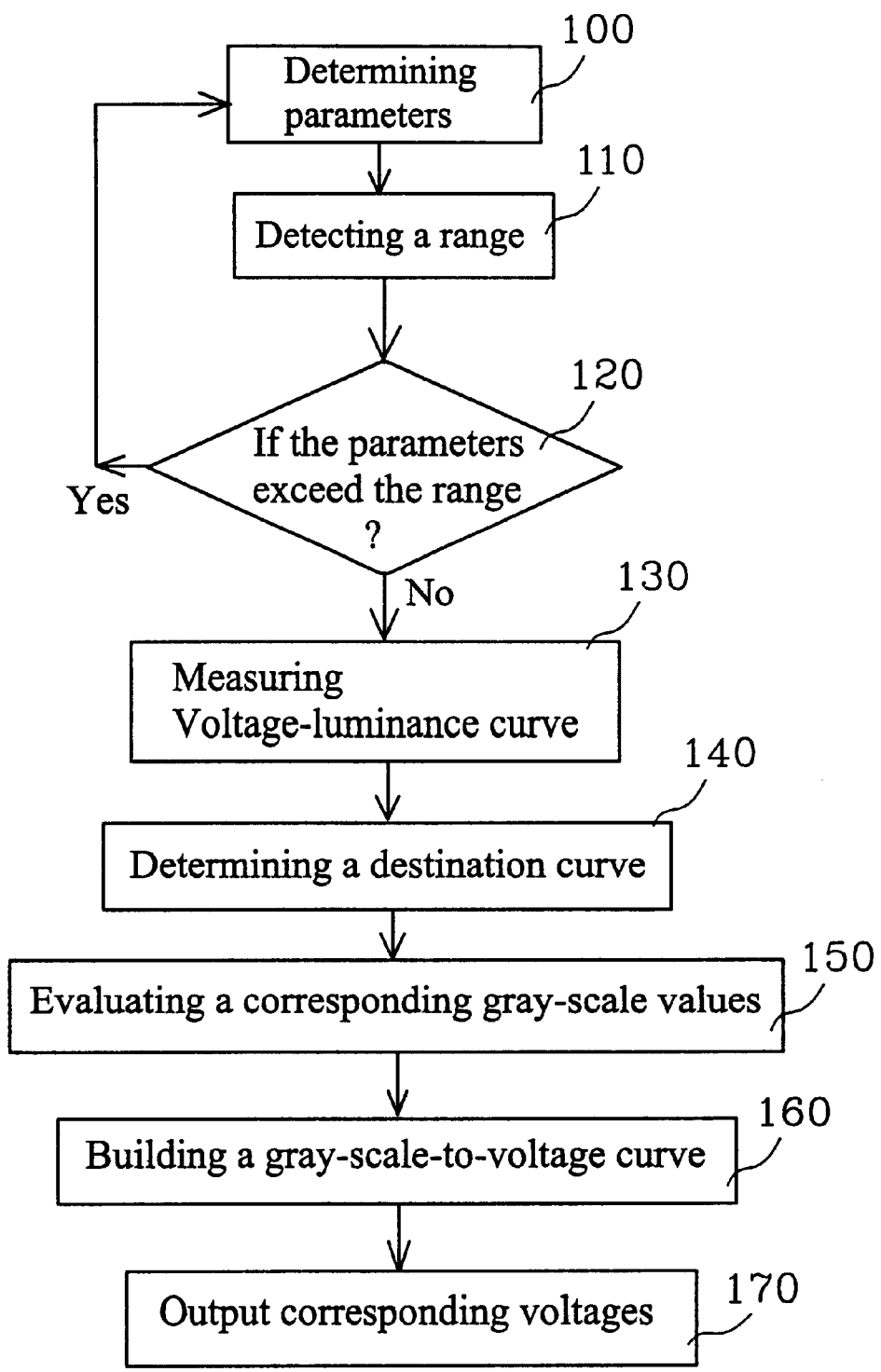
FIG. 14 is a flow chart illustrating the automatic Gamma parameter correction method for the display with the system as shown in FIG. 7A in accordance with one embodiment of the present invention.

From the above description, the present invention provides an automatic Gamma parameter correction method for displays. Please refer to FIG. 14, which a flow chart illustrating the automatic Gamma parameter correction method for the display with the system as shown in FIG. 7A in accordance with one embodiment of the present invention. The related steps of the method are described as below:

Step 100: determining the related parameters for the display. For example, contrast=300, luminance=250 cd/m$^2$, color temperature=6500K, and the Gamma values of image equals 1. these values can be input by the users or can be the default values downloaded from the memory 21 when the system is activated. It is preferable that the user can only adjust the values within a pre-determined voltage range, so that there is no need for additional testing for examining if the values are beyond the display.

Figure 15A:
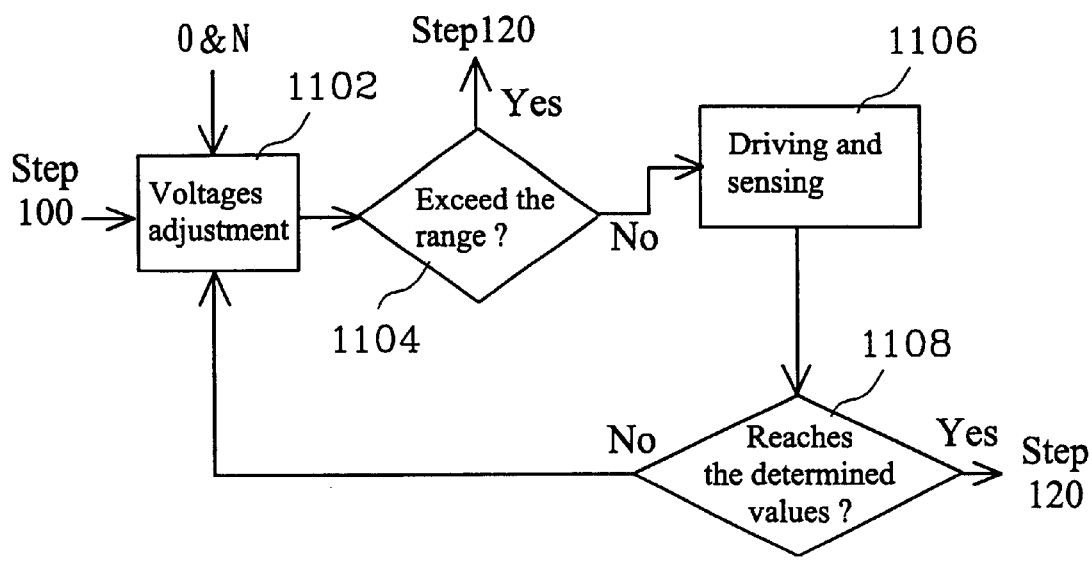
FIG. 15A is a flow chart illustrating the setting steps of the display (from 100 to 120) in more detail in accordance with one embodiment of the present invention.

Step 110: determining the driving voltage range according to the parameters. The present step is as shown in FIG. 15A, which is a flow chart illustrating the setting steps of the display (from 100 to 120) in more detail in accordance with one embodiment of the present invention. Firstly, within the pre-determined voltage range, it is provided a lowest (0th) gray-scale voltage and a highest (Nth) gray-scale voltage (denoted by Vmin and Vmax, respectively) so as to perform the voltage adjustment 1102. If Vmin and Vmax exceed the pre-determined voltage range, the system outputs a signal showing that the range for display has been. exceeded and goes forwards to the next step (120) 1104. If Vmin and Vmax exceed the pre-determined voltage range, the system goes forwards to step 1106 in which the display is driven and the luminance is sensed. If the luminance reaches the determined value, Vmin and Vmax are recorded and then the system goes forwards to the next step (120) 1108. If the luminance does not reach the determined value, it is provided a new lowest (0th) gray-scale voltage and a new highest (Nth) gray-scale voltage and performs the voltage adjustment 1102 again until the determined value is reached.

Step 120: repeating step 100 if the determined parameters exceed the driving voltage range for the display; otherwise, delivering Vmin and Vmax to the next step if the determined parameters are accepted by the display.

Figure 15B:
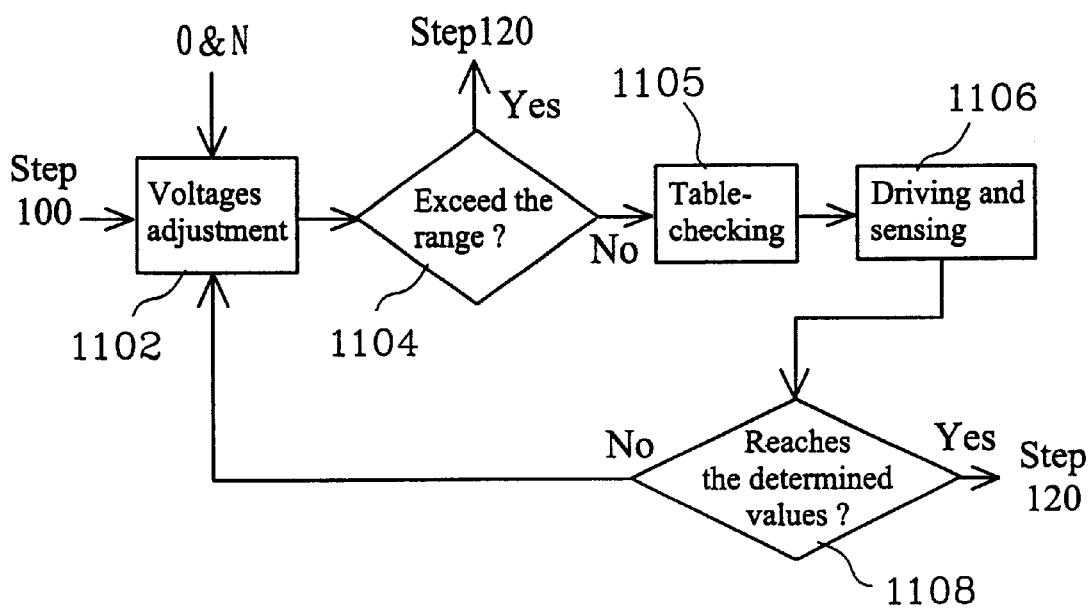
FIG. 15B is a flow chart illustrating the setting steps of the display (from 100 to 120) in more detail in accordance with one embodiment of the present invention, wherein table-checking is used to build up the voltage-to-luminance relation.

Step 130: measuring the voltage-to-luminance curve of the display. In one embodiment, it is provided an original gray-scale-to-voltage transfer curve and outputs a series of gray-scale patterns that are to be measured by the sensors so as to obtain a gray-scale-to-luminance curve. Then a voltage-to-luminance curve, as shown in FIG. 8, is evaluated according to the original gray-scale-to-voltage transfer curve. Alternatively, it is provided a completely white image frame. The digital code of a completely white image frame corresponds to the first or the last external reference voltage and thus the external reference voltage range varies continuously. Therefore, the voltage-to-luminance curve of the display can be obtained by continuously measuring the luminance of the completely white image frame under different reference voltages. On the other hand, the voltage-to-luminance curve can be obtained by table-checking. Please refer to FIG. 15B, which a flow chart illustrating the setting steps of the display (from 100 to 120) in more detail in accordance with one embodiment of the present invention, wherein table-checking is used to build up the voltage-to-luminance relation. In FIG. 15B, there is provided a table-checking step eis 1105 between step 1104 and step 1106 so that the voltage-to-luminance curve can be obtained by table-checking.

Step 140: determining the destination function of gray-scale-to voltage transfer curve. Several factors are taken into account, which include the voltage-to-luminance curve (as shown FIG. 8), the Gamma transfer curve for image transmission, and the Gamma value of the image ($\gamma_{image}$). When $\gamma_{image}$ is 1, the destination function of gray-scale-to-voltage transfer curve is a reverse function of the Gamma transfer curve for image transmission (as shown in FIG. 9). When the voltage-to-luminance curve is determined, the gray-scale-to-voltage transfer curve (as shown in FIG. 10) can be determined according to the voltage-to-luminance curve of the display. The gray-scale-to-voltage transfer curve can be implemented by using the voltage dividing circuit 50.

Step 150: evaluating the Gamma reference voltages required by the voltage dividing circuit 50 as well as the corresponding gray-scale values. The Gamma reference voltages and the corresponding gray-scale values can be optimized by using computer software and then loaded into the display circuit.

Step 160: interconnecting the Gamma reference voltages and the corresponding gray-scale values by using the programmable switches 41, 42, 43 and the switch control unit 40, so as to build up a gray-scale-to-voltage curve. However, tie Gamma reference voltages and the corresponding gray-scale values can also be obtained by performing table-checking, to obtain the numerical data of the Gamma reference voltages as well as the corresponding gray-scale values.

Step 170: outputting a corresponding voltage to the series of output buffers 60 by using the voltage dividing circuit 50 according to the input gray-scale value of the image.

Furthermore, the present invention further provides a method for measuring the voltage-to-luminance curve for automatic Gamma parameter correction for displays, comprising the steps of: (a) determining related parameters for said displays;. (b) determining a driving voltage range according to the parameters; (c) measuring a voltage-to-luminance curve of said displays; (d) determining a destination function of gray-scale-to-voltage transfer curve; (e) evaluating a set of Gamma reference voltages required by said voltage dividing circuit as well as a set of corresponding gray-scale values; (f) interconnecting the set of Gamma reference voltages and the set of corresponding gray-scale values by using said programmable switches and said switch control unit, so as to build up a gray-scale-to-voltage curve; and (g) outputting a corresponding voltage to a series of output buffers by using said voltage dividing circuit according to the input gray-scale value of the image.

The present invention has been experimentally examined to be practical and useful. The curves, as shown in FIG. 11, have been verified according to the voltage range and also some other conditions, as stated below:

(a) 9 Gamma reference voltages;
(b) a 256-gray-scale display;
(c) serially connected resistors for the voltage dividing circuit;
(d) linear transfer between any two of the Gamma voltages;
(e) a voltage-to-luminance curve as shown in FIG. 8; and
(f) a gray-scale-to-luminance destination curve as shown in FIG. 9.

Figure 11:
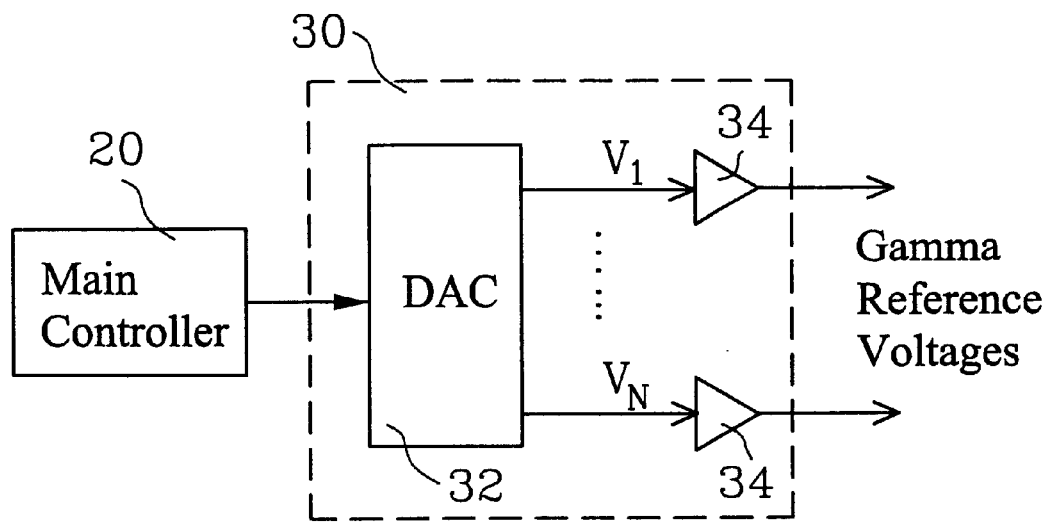
FIG. 11 is a schematic circuit diagram of a programmable Gamma voltage generating means in accordance with one embodiment of the present invention.
Figure 16A:
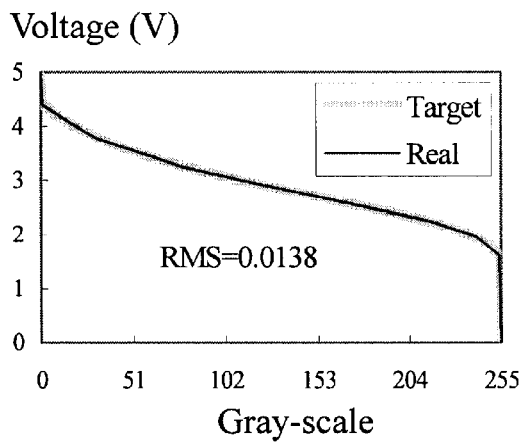
FIGS. 16A–16B show two graphs illustrating the curves for verification of the performance the when Vmin=0V and Vmax=5V in accordance with one embodiment of the present invention.
Figure 16B:
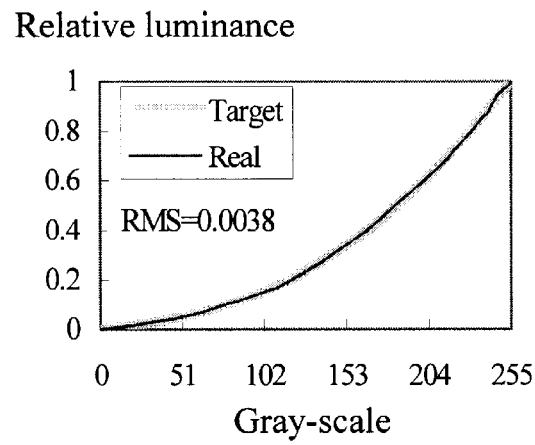
Figure 17A:
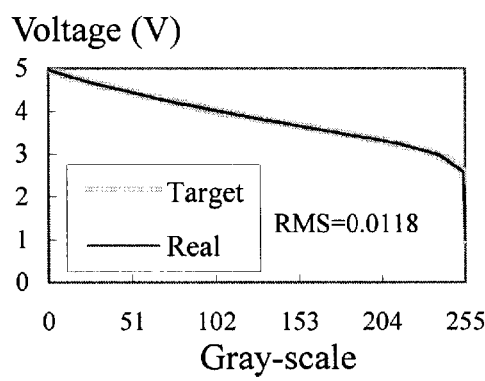
FIGS. 17A–17B show two graphs illustrating the curves for verification of the performance the when Vmin=1V and Vmax=5V in accordance with one embodiment of the present invention.
Figure 17B:
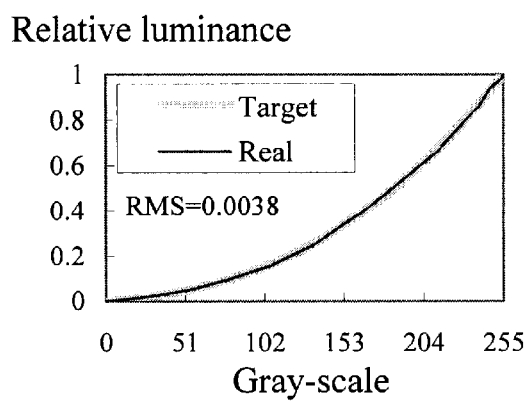
Figure 18A:
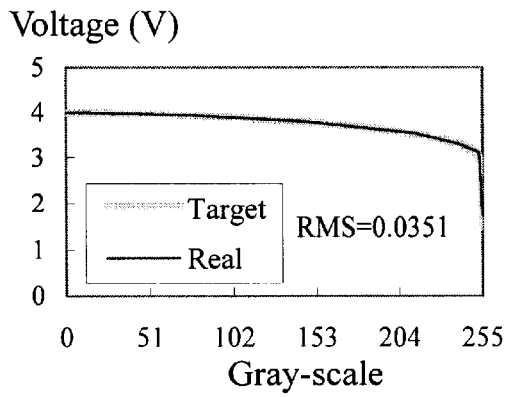
FIGS. 18A–18B show two graphs illustrating the curves for verification of the performance the when Vmin=1.5V and Vmax=4V in accordance with one embodiment of the present invention.
Figure 18B:
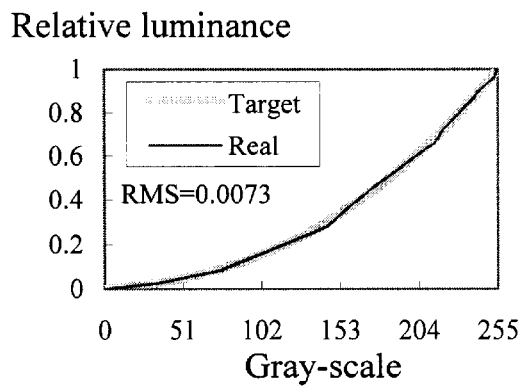

For the three destination curves shown in FIG. 11, computer software is used to change the corresponding gray-scales of the 9 Gamma reference voltages and then optimize the Gamma voltages. The experimental results are shown in FIGS. 16 to 18. More particularly, FIG. 16 shows two graphs illustrating the curves for verification of the performance the when Vmin=0V and Vmax=5V, wherein FIG. 16A shows a gray-scale-to-voltage curve and FIG. 16B shows a gray-scale-to-luminance curve; FIG. 17 shows two graphs illustrating the curves for verification of the performance the when Vmin=1V and Vmax=5V, wherein FIG. 17A shows a gray-scale-to-voltage curve and FIG. 17B shows a gray-scale-to-luminance curve; and FIG. 18 shows two graphs illustrating the curves for verification of the performance the when Vmin=1.5V and Vmax=4V, wherein FIG. 18A shows a gray-scale-to-voltage curve and FIG. 18B shows a gray-scale-to-luminance curve. From the above description, the present invention is examined to be feasible and practical.

On the other hand, the present invention also provides the relation between temperature and the Gamma parameters. When the temperature of a display changes, the voltage-to-luminance curve shifts. Such knowledge is disclosed, for example, in U.S. Pat. No. 6,046,719. A temperature sensor can be added to the system according to the present invention, so as to obtain the temperature-depending gray-scale-voltage transfer function. The Gamma reference voltages required by the working display could be input into the working display by using the programmable Gamma voltage generating means 30. The major difference between U.S. Pat. No. 6,046,719 and the present invention is that the former performs Gamma correction by changing the digital codes of the image and the latter former performs Gamma correction by changing the reference voltages for the working display.

Therefore, the present invention provides a method for measuring the operating temperature for automatic Gamma parameter correction for displays, comprising the steps of: (a) measuring an operating temperature of said displays; (b) determining a voltage-to-luminance curve of said displays by using table-checking; (c) determining a destination function of a gray-scale-to-voltage transfer curve; (d) evaluating a set of Gamma reference voltages required by said voltage dividing circuit as well as a set of corresponding gray-scale values; (e) interconnecting said Gamma reference voltages and said corresponding gray-scale values by using said programmable switches and said switch control unit, so as to build up a gray-scale-to-voltage curve; and (f) outputting a corresponding voltage to a series of output buffers by using said voltage dividing circuit according to said input gray-scale value of the image.

Furthermore, the foregoing method can be used in cooperation with a table-checking step. In other words, the present invention provides a method for measuring the operating temperature for automatic Gamma parameter correction for displays, comprising the steps of: (a) measuring an operating temperature of said displays; (b) determining a set of Gamma reference voltages required by said voltage dividing circuit as well as a set of corresponding gray-scale values by using table-checking; (c) interconnecting said Gamma reference voltages and said corresponding gray-scale values by using said programmable switches and said switch control unit, so as to build up a gray-scale-to-voltage curve; and (d) outputting corresponding voltages to a series of output buffers by using said voltage dividing circuit according to said input gray-scale value of the image.

In summary, compared with the prior art, the present invention provides advantageous characteristics as stated below:

(1) Performing Gamma correction by changing the reference voltages for the display without any gray-scale loss;

(2) Providing a greater degree of freedom for the realization of the correction of Gamma parameters due to the fact that the Gamma reference voltages as well as the corresponding gray-scale values are adjustable; and (3) Simplifying the voltage dividing circuit design of the display driving circuitry due to the fact that any two of the Gamma voltages can be implemented by using a linear voltage dividing circuit.

As discussed so far, in accordance with the present invention, there is provided automatic Gamma parameter correction systems for displays, wherein the Gamma reference voltages as well as the corresponding gray-scale values are adjustable. Such a Gamma parameter correction system provides a greater degree of freedom for the realization of the correction of Gamma parameters. Consequently, the present invention has been examined to be progressive and has great potential in commercial applications.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. An automatic Gamma parameter correction system for displays, comprising:

a plurality of sensors, disposed inside said display or outside said display for obtaining a voltage-to-luminance curve so as to evaluate a set of Gamma reference voltages;

a main controller, connected to said sensors to serve as a main control circuit for said system, and further including a central process unit (CPU) and a memory for parameter calculation and data storage;

a programmable Gamma voltage generating means, connected to said main controller and generating said set of Gamma reference voltages output into the input terminals of a set of programmable switches according to said Gamma reference voltages evaluated by a central process unit in said main controller, therefor said Gamma reference voltages are adjustable;

a set of programmable switches, connected to said programmable Gamma voltage generating means so as to receive an output voltage and also connected to a switch control unit so as to interconnect the output terminals of said programmable switches and a voltage dividing circuit with a set of corresponding gray-scale values according to gray-scale signals with respect to a switch control unit;

a switch control unit, having an input terminal connected to said main controller and the output terminals connected to said programmable switches, so that said switch control unit interconnects the output terminals of said programmable switches and said voltage dividing circuit having a series divided voltage points and then applies said Gamma reference voltages to the corresponding divided voltage points according to said corresponding gray-scale signals delivered from said central process unit, therefor said corresponding gray-scale signals are adjustable; and a voltage dividing circuit, implemented by using a digital-to-analog converter (DAC), having an input terminal connected to the output terminals of said programmable switches; wherein for an N-gray-scale system, said voltage dividing circuit output at least $2^N$ divided voltages, and then said voltages are further connected to a series of output buffers;

wherein during Gamma parameter correction operation, the parameters related to said system are determined; a voltage-to-luminance curve of said display is then evaluated by using said sensors according to said driving voltage range determined by the parameters; later, a destination function of said gray-scale-to-voltage transfer curve is determined by said main controller, and said transfer curve is further implemented by said voltage dividing circuit; then, said Gamma reference voltages required by said voltage dividing circuit as well as said corresponding gray-scale values are evaluated, that is both the Gamma reference voltages and the corresponding gray-scale values are adjustable by CPU evaluating; further, said Gamma reference voltages and said corresponding gray-scale values are interconnected by said programmable switches and said switch control unit, so as to build up a gray-scale-to-voltage curve; and said voltage dividing circuit outputs corresponding voltages to said output buffers according to said input gray-scale values of the image.

2. The automatic Gamma parameter correction system as recited in claim 1, wherein said sensors can be light sensors, temperature sensors, pixel voltage sensors, or a pixel charging/discharging current sensors used for measuring at least one parameter so as to evaluate said voltage-to-luminance curve or said Gamma voltage as well as said corresponding digital gray-scale value required to establish a gray-scale-to-voltage destination curve for driving displays during said operation of said system.

3. The automatic Gamma parameter correction system as recited in claim 1, wherein said memory of said main controller can store at least one gray-scale-to-luminance destination curve and said a set of Gamma reference voltages evaluated by said central process unit as well as said corresponding gray-scale values.

4. The automatic Gamma parameter correction system as recited in claim 1, wherein said central process unit includes an operation of loading said voltage-to-luminance curve and said gray-scale-to-luminance destination curve and determining said Gamma reference voltage range according to luminance, contrast and color temperature, so as to fit said curve representing said transfer function of said destination gray-scale values and said voltages required to drive the working displays properly.

5. The automatic Gamma parameter correction system as recited in claim 1, wherein said central process unit includes an operation of optimizing by using programs to evaluate said Gamma reference voltages and said corresponding gray-scale values of said desired gray-scale-to-luminance destination curve.

6. The automatic Gamma parameter correction system as recited in claim 1, wherein said programmable Gamma voltage generating means is composed of a digital-to-analog converter (DAC) connected to a plurality of buffers, so as to output said Gamma reference voltages by adjusting said received destination function of said Gamma voltage outputs by said main controller.

7. The automatic Gamma parameter correction system as recited in claim 1, wherein the number of said programmable switches is smaller than of the number of said output voltages of said voltage dividing circuit.

8. The automatic Gamma parameter correction system as recited in claim 1, wherein said voltage dividing circuit is composed of a plurality of resistors.

9. The automatic Gamma parameter correction system as recited in claim 1, wherein said voltage dividing circuit is composed of a plurality of capacitors.

10. The automatic Gamma parameter correction system as recited in claim 1, wherein said voltage dividing circuit is composed of a plurality of resistors and capacitors.

11. The automatic Gamma parameter correction system as recited in claim 1, wherein said voltage dividing circuit is further connected to a plurality of buffers so as to improve the drivability for a next stage.

12. A method for measuring the voltage-to-luminance curve for automatic Gamma parameter correction for displays, comprising the steps of:
 (a) determining related parameters for said displays;
 (b) determining a driving voltage range according to said Gamma parameters;
 (c) measuring a voltage-to-luminance curve of said displays;
 (d) determining a destination function of gray-scale-to-voltage transfer curve;
 (e) evaluating a set of Gamma reference voltages required by a voltage dividing circuit as well as a set of corresponding gray-scale values;
 (f) interconnecting said Gamma reference voltages and said corresponding gray-scale values by using a set of programmable switches and a switch control unit, so as to build up a gray-scale-to-voltage curve; and
 (g) outputting corresponding voltages to a series of output buffers by using said voltage dividing circuit according to a set of input gray-scale values of the image.

13. A method for measuring the operating related parameter (temperature or/and luminance) for automatic Gamma parameters correction for displays, comprising the steps of:
 (a) measuring an operating related parameter (temperature or/and luminance) of said displays;
 (b) determining a voltage-to-luminance curve of said displays by using table-checking;
 (c) determining a destination function of a gray-scale-to-voltage transfer curve;
 (d) evaluating a set of Gamma reference voltages required by a voltage dividing circuit as well as a set of corresponding gray-scale values;
 (e) interconnecting said Gamma reference. voltages and said corresponding gray-scale values by using a set of programmable switches and a switch control unit, so as to build up a gray-scale-to-voltage curve; and
 (f) outputting corresponding voltages to a series of output buffers by using said voltage dividing circuit according to a set of input gray-scale values of the image.

14. A method for measuring the operating related parameter (temperature or/and luminance) for automatic Gamma parameter correction for displays, comprising the steps of:
 (a) measuring an operating related parameter (temperature or/and luminance) of said displays;
 (b) determining a set of Gamma reference voltages required by said voltage dividing circuit as well as a set of corresponding gray-scale values by using table-checking;
 (c) interconnecting said Gamma reference voltages and said corresponding gray-scale values by using a set of programmable switches and a switch control unit, so as to build up a gray-scale-to-voltage curve; and
 (d) outputting corresponding voltages to a series of output buffers by using said voltage dividing circuit according to a set of input gray-scale values of the image.

15. An automatic Gamma parameter correction system accompanied with at least a conventional data driver for displays, comprising:

a plurality of sensors, disposed inside said display for sensing the relative luminance of a series of voltage signals so as to obtain a voltage-to-luminance curve;

a main controller, connected to said sensors to serve as a main control circuit for said system, and further including a central process unit (CPU) and a memory for parameter calculation and data storage;

a programmable Gamma voltage generating means, connected to said main controller and generating a set of Gamma reference voltages output into the input terminals of said data driver according to a set of reference voltages evaluated by said central process unit in said main controller; and at least a data driver, directly connected to said programmable Gamma voltage generating means and generating image driving signals delivered into said display according to said Gamma reference voltage outputs by said programmable Gamma voltage generating means.

16. The automatic Gamma parameter correction system as recited in claim 15, wherein said sensors can be light sensors, temperature sensors, pixel voltage sensors, or a pixel charging/discharging current sensors used for measuring at least one parameter so as to evaluate said voltage-to-luminance curve or said Gamma voltages required by said data driver during said operation of said system.

17. A method for measuring the voltage-to-luminance curve for automatic Gamma parameter correction for displays, comprising the steps of:

(a) determining related parameters for said displays;

(b) determining a driving voltage range according to said Gamma parameters;

(c) repeating (a) if said determined parameters exceed a driving voltage range for said displays;

(d) measuring a voltage-to-luminance curve of said displays;

(e) determining a destination function of gray-scale-to-voltage transfer curve;

(f) evaluating a set of Gamma reference voltages required by a voltage dividing circuit as well as a set of corresponding gray-scale values;

(g) interconnecting said Gamma reference voltages and said corresponding gray-scale value by using a set of programmable switches and a switch control unit, so as tobuild up a gray-scale-to-voltage curve; and (h) outputting a set of corresponding voltages according to a set of input gray-scale values of the image.

18. The automatic Gamma parameter correction method as recited in claim 17, wherein said related parameters in said step (a) include at least contrast, luminance, color temperature, and said Gamma values of image.

19. The automatic Gamma parameter correction method as recited in claim 17, wherein said step (b) comprises:

providing a lowest gray-scale voltage and a highest gray-scale voltage (denoted by Vmin and Vmax, respectively) so as to perform voltage adjustment;

recoding Vmin and Vmax and going forwards to the next step if said luminance reaches said determined value;

providing a new lowest gray-scale voltage and a new highest gray-scale voltage and performing voltage adjustment again until said determined value is reached if said luminance does not reach said determined value.

20. The automatic Gamma parameter correction method as recited in claim 17, wherein said step (d) comprises:

providing an original gray-scale-to-voltage transfer curve and outputting a series of gray-scale patterns which are to be measured by a plurality of sensors so as to obtain a gray-scale-to-luminance curve; and evaluating a voltage-to-luminance curve according to said original gray-scale-to-voltage transfer curve.

21. The automatic Gamma parameter correction method as recited in claim 17, wherein said step (d) comprises:

providing a completely white image frame; and continuously measuring the luminance of said completely white image frame under different reference voltages and obtaining a voltage-to-luminance curve, wherein the digital code of a completely white image frame corresponds to the first or the last external reference voltage and thus the external reference voltage range varies continuously.

22. The automatic Gamma parameter correction method as recited in claim 17, wherein said step (d) further comprises:

performing table-checking, to obtain the numerical data of said voltage-to-luminance curve.

23. The automatic Gamma parameter correction method as recited in claim 17, wherein said step (e) comprises:

considering the voltage-to-luminance curve, the Gamma transfer curve for image transmission, and the Gamma value of the image ($\gamma_{image}$);

determining a voltage-to-luminance curve; and determining a gray-scale-to-voltage transfer curve according to said voltage-to-luminance curve of said display.

24. The automatic Gamma parameter correction method as recited in claim 17, wherein said step (f) comprises:

optimizing said Gamma reference voltages and said corresponding gray-scale values by using computer software;

loading said optimized result into said displays.

25. The automatic Gamma parameter correction method as recited in claim 17, wherein said step (g) comprises:

performing table-checking, to obtain the numerical data of a set of Gamma reference voltages as well as a set of corresponding gray-scale values.

* * * * *